Oct. 12, 1965  C. L. WALKER  3,211,215
HEAT EXCHANGERS SUITABLE FOR SPACE USE
Filed Feb. 1, 1961  2 Sheets-Sheet 1

INVENTOR.
Curtis L. Walker
BY
George E. Johnson
ATTORNEY

Oct. 12, 1965

C. L. WALKER 3,211,215

HEAT EXCHANGERS SUITABLE FOR SPACE USE

Filed Feb. 1, 1961

INVENTOR.
Curtis L. Walker
BY
George E. Johnson
ATTORNEY though not actually in this case shown but depending on the fluid and temperatures to be encountered, could be brazing, welding or any other form which will provide good thermal conductivity between the parts.

United States Patent Office
3,211,215
Patented Oct. 12, 1965

3,211,215
HEAT EXCHANGERS SUITABLE FOR SPACE USE
Curtis L. Walker, Indianapolis, Ind., assignor to General Motors Corporation, Detroit, Mich., a corporation of Delaware
Filed Feb. 1, 1961, Ser. No. 86,459
2 Claims. (Cl. 165—46)

This invention relates to heat exchangers and more particularly to a heat exchanger suitable for use in space vehicles and satellites.

In space and satellite power systems, solar and nuclear energy sources hold great promise, for the equipment for supplying energy in fluid power systems for use in space must be characterized by minimum weight, maximum reliability in vacuum and weightless environments, high resistance to micrometeorite damage, and compactness for launching. It is also obvious that each power system for use in space must not only require a mechanism for converting that energy to a useful form, but also a means of rejecting waste heat which cannot be converted.

The use of the sun rather than a reactor has much merit but one prominent difficulty encountered in both is that the radiator or heat exchanger for eliminating waste heat must be sufficiently resistant to micrometeorite damage. It also must be light in structure yet possessive of adequate capacity.

It has now been found that for temperatures up to 400° F., the heat exchanger unit may be fabricated of aluminum and tubes utilized in the construction may be surrounded by an aluminum shield substantially reducing the probability of micrometeorite penetration during an extended flight period. Where the heat exchanger encounters a temperature in excess of 400° F., it is advisable to use steel tubes brazed to aluminum sheet material or to use all steel construction. The latter material, however, is not preferred as it results in a significantly higher heat exchanger weight despite thinness of the sheet material employed.

An object of the present invention is to provide a compact, lightweight heat exchanger unit suitable for use in a satellite, for space use or in other fields wherein compactness and lightweight are essential characteristics.

Another object is to provide a heat exchanger for space flight in the use of which the probability of failure from micrometeorite penetration is minimized.

Another object of the invention is to provide a resilient heat exchanger unit which may be compactly retained for launching purposes in connection with a space vehicle or satellite and which may be released after launching to a form more conducive to effective heat transference.

To these ends, a feature of the invention pertains to a heat exchanger in which a metallic sheet and tubes are integral in a resilient construction for retention in a compact form by a releasable shell. Another feature of the invention is a resilient heat exchanger structure including a metallic sheet with tubes integral therewith and having shielding means spaced from each of the tubes but joined to the sheet so as to protect the tubes from micrometeorite damage but leaving the sheet substantially exposed for radiating the heat received in the tubes.

These and other important features of the invention will now be described in detail in the specification and then pointed out more particularly in the appended claims.

Figure 1:
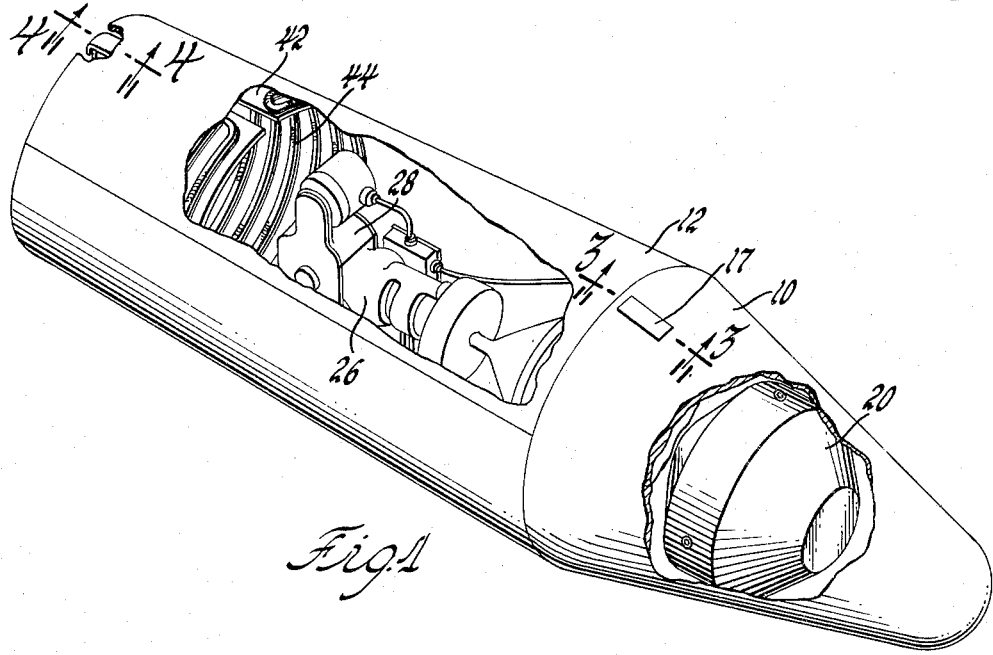
FIGURE 1 depicts a perspective view of a nose cone and pay load section of a satellite in which a heat exchanger of the present invention is embodied.
Figure 3:
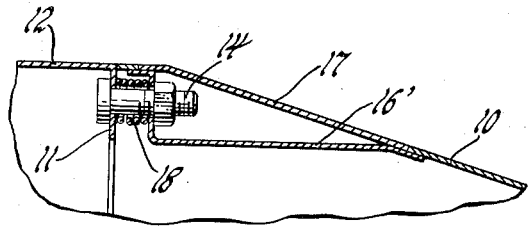
FIGURE 3 is an enlarged sectional view of a detail of construction looking in the direction of the arrows 3—3 in FIGURE 1.

In FIGURE 1 is depicted the final stage of a satellite with a nose cone 10 joined to a pay load shell 12 by means of explosive rivets or bolts such as the bolt 14 shown in FIGURE 3. The nose cone 10 has several notches such as the notch 16' for the reception of the bolts 14 in the holding of the cone to an annular flange 11 of the shell 12. A cover plate 17 is welded in place to close each notch 16'. A spring 18 is compressed between the shell 12 and the cone so that upon explosion of the bolt 14 by timing prearrangement or by radio signal, the cone will be discarded from the shell.

Figure 4:
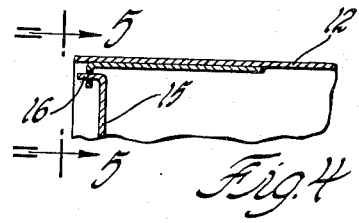
FIGURE 4 is a sectional view drawn to an enlarged scale showing a detail of construction looking in the direction of the arrows 4—4 in FIGURE 1.
Figure 5:
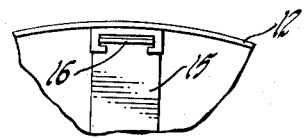
FIGURE 5 is a view looking in the direction of the arrows 5—5 in FIGURE 4.

The shell 12 is made in multiple sections so that when the nose cone 10 is removed, the sections will fall away from the power plant and pay load enclosed within the shell. An element 15 extends across the stern end of the shell 12 and is unhooked from the sections at two or more slot and tongue arrangements 16 as shown in FIGURES 4 and 5.

Details regarding the nose cone 10, the shell 12 and the pay load as well as other units in the satellite are not specifically described herein as they form no part of the present invention, the latter being primarily concerned with the nature of the heat exchanger used with the power plant. It suffices herein to state, however, that during launching the nose cone 10 will protect an antenna 20, an expandable reflector 22, a lens 24, a regenerator 26, and an engine 28. In flight, the inflated reflector 22 is enabled to direct solar heat to the lens 24 for use in the engine 28. Waste heat from the engine is withdrawn by means of a pump 30 and is directed by conduit means 32 and 34 to and from serpentine tubes 36. The fluid for carrying the waste heat to the tubes is cooled and then returned to the regenerator 26 of the closed system by means of a return conduit 38.

Figure 6:
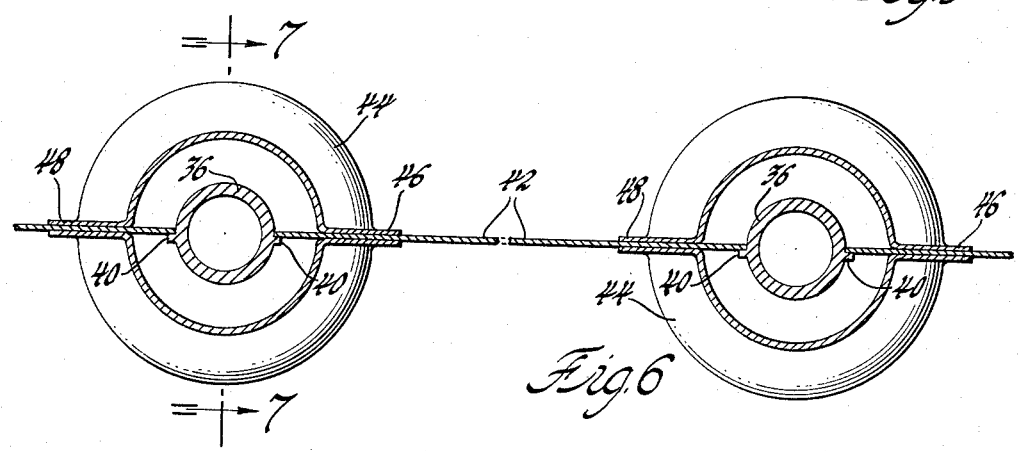
FIGURE 6 is an enlarged sectional view of a portion of the heat exchanger looking in the direction of the arrows 6—6 in FIGURE 2.
Figure 7:
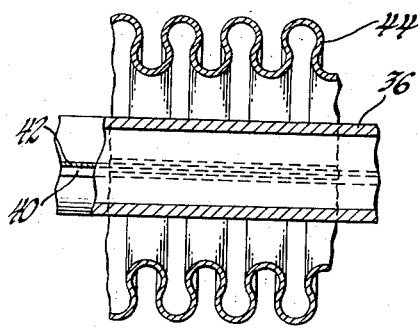
FIGURE 7 is a sectional view looking in the direction of the arrows 7—7 in FIGURE 6.

The tubes 36 each bear integral and substantially diagonally opposed exterior flanges 40 as shown in FIGURE 6. These flanges are brazed to a fin or a thin sheet of aluminum 42 and the tubes extend in such a direction that the thin sheet and the relatively thick tubes will conform to the cylindrical configuration of the assembled shell 12 as shown in FIGURE 1. The conduit means 32 and 34 extend across the sheet 42 midway its length so that while the power plant is within the cylindrical shell 12 the conduit means extends along the length of the shell. The tubes 36 are each enclosed by means of shielding means 44. Each length of shielding means 44 is corrugated as in FIGURE 7 giving it considerable resiliency and it is made in two halves with each half being flanged as at 46 and 48 and brazed to the sheet 42.

Figure 8:
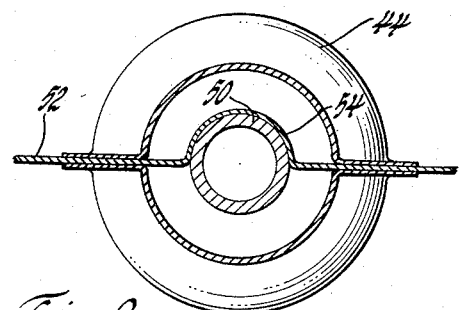
FIGURE 8 shows a modified form of construction for the tube and sheet joinder in the heat exchanger.

In FIGURE 8, a different tube form is utilized as at 50. This tube form has no flanges thereon but it is brazed directly to a fin or thin sheet 52 which is bent in such a way as to conform at 54 with half or a portion of the exterior of the tube giving substantial areas in interfacial contact. Attachment of the tube 50 to the sheet 52 at 54 is by brazing. Shielding means 44 is used as in FIGURE 6.

Figure 2:
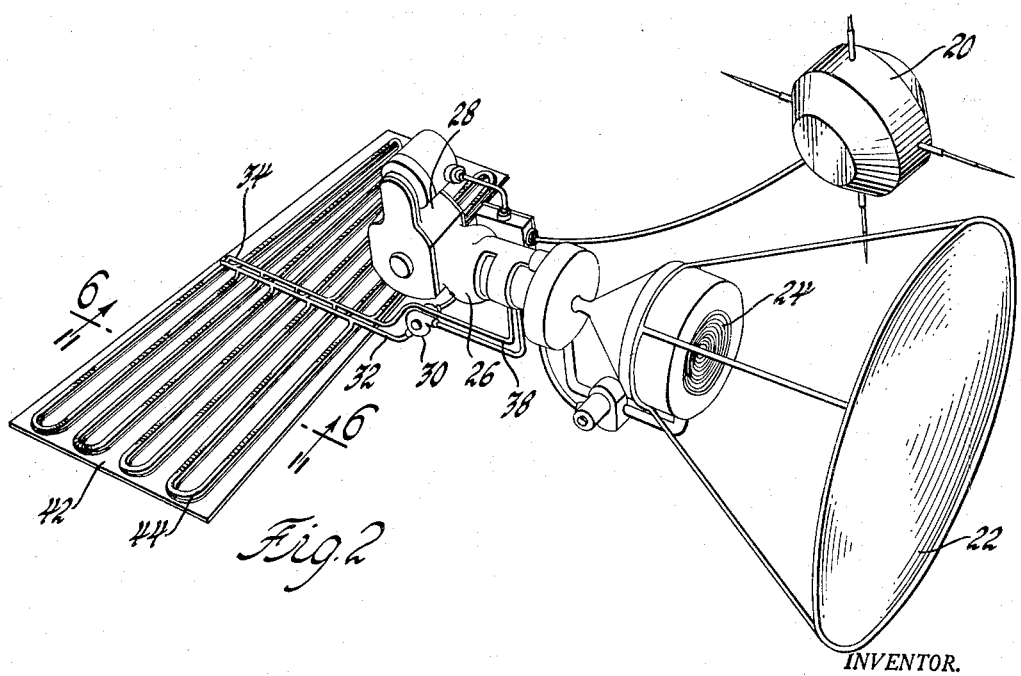
FIGURE 2 is a view of the power system shown in FIGURE 1 while in orbit and with the nose cone and enclosing shell removed.

In operation, the space vehicle or satellite is launched and placed in flight with the final stage as depicted in FIGURE 1. At the proper moment and usually in accordance with signals received by the antenna 20, the bolts holding the nose cone to the shell 12 will be detonated and the nose cone 10 and shell 12 will be separated from the enclosed components leaving them exposed. With the release of the power plant, the natural resiliency or spring action of the sheet 42 will cause the latter to lose its cylindrical form as seen in FIG. 1 and to flatten out as in FIG. 2 causing waste heat effectively to be dissipated first by conduction from the tubes 36 into the sheet 42 and then from the latter into space by radiation.

In one particular design a suitable resistance against penetration by micrometeorites is provided with an aluminum wall thickness of .040 inch for the tubes 36 when shielding is used. A satisfactory thickness for the sheet 42 is approximately 0.011 inch. A desirable spacing of the parallel portions of the tubes 34, that is, as measured between their axes is 7.2 inches, this giving a substantial exposure of heat radiation surface to the sheet material 42 between portions of the tubes 36 or 50 and outside the shielding means 44. The percentage of over-all radiator area thus requiring protection of some type from meteoric damage is greatly reduced from that which would be required in the use of other types of heat exchangers such as radiating-tube type exchangers. The tubes 36 or 50 are sufficiently small in diameter (0.1875 inch) to permit bending the heat exchanger to a five-foot diameter without permanent deformation. The shielding 44 reduces the thickness otherwise necessary for the tubes 36 or 50. The "bumper" or shielding 44 is a thin skin (preferably about one-tenth the thickness of the wall of the tube 36 or 50) and is placed a distance such as two tube wall thickness away from each of the tubes. Experience and studies have determined that in the impact between a satellite and a meteoric particle, the latter decelerates to a point where the rate of conversion of kinetic energy to thermal energy is sufficiently large to cause an explosion. The shielding 44 effects the explosion far enough away from the tubes 36 or 50 so that the latter will be struck only by the resulting hot gases.

Although not shown in the drawings, the conduit means 32 and 34 may also and preferably be provided with shielding in the same manner as on the tubes 34 or 50.

I claim:
1. A heat exchanger arrangement comprising a shell and heat exchanger, said shell having an inside surface restraining said heat exchanger within it, means for releasing said shell from said heat exchanger, said heat exchanger comprising a thin resilient metallic sheet and relatively thick tubes fixed to the latter, opposite ends of said sheet being held in adjacent relation by said shell to maintain a cylindrical contour of the sheet, conduit means extending along the length of said shell and connected with said tubes to serve as means for admitting and discharging a fluid to and from said tubes, corrugated resilient shielding means extending along the length of each of said tubes and spaced from and enclosing the latter, and a substantial area of each side of said sheet extending from the shielding means of one of said tubes to the shielding means of an adjacent tube thereby being adapted to expedite heat radiation from the sheet subsequent to release of said shell and consequent outward spring action of said sheet from its cylindrical contour.

2. A heat exchanger arrangement such as set forth in claim 1, said sheet and a portion of the exterior of at least one of said tubes having substantial areas in interfacial contact.

References Cited by the Examiner
UNITED STATES PATENTS

| 2,268,386 | 12/41 | Fisher | 165—156 X |
| 2,621,027 | 12/52 | Tatsch | 165—126 X |
| 2,629,988 | 3/53 | Lee | 165—171 |
| 2,856,163 | 10/58 | Bidak et al. | 165—171 |

FOREIGN PATENTS

| 321,450 | 11/29 | Great Britain. |

CHARLES SUKALO, *Primary Examiner.*
HERBERT L. MARTIN, PERCY L. PATRICK,
*Examiners.*